(12) United States Patent
Kamekawa

(10) Patent No.: US 10,467,209 B2
(45) Date of Patent: Nov. 5, 2019

(54) DOCUMENT MANAGEMENT CLIENT APPARATUS AND DOCUMENT MANAGEMENT METHOD

(71) Applicant: CANON KABUSHIKI KAISHA, Tokyo (JP)

(72) Inventor: Mikihiko Kamekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 724 days.

(21) Appl. No.: 15/061,714

(22) Filed: Mar. 4, 2016

(65) Prior Publication Data

US 2016/0267114 A1    Sep. 15, 2016

(30) Foreign Application Priority Data

Mar. 9, 2015 (JP) ................................ 2015-046437

(51) Int. Cl.
| | |
|---|---|
| *G06F 16/22* | (2019.01) |
| *G06F 16/93* | (2019.01) |
| *G06F 16/185* | (2019.01) |
| *G06F 16/16* | (2019.01) |
| *G06F 16/13* | (2019.01) |

(52) U.S. Cl.
CPC .............. *G06F 16/22* (2019.01); *G06F 16/13* (2019.01); *G06F 16/16* (2019.01); *G06F 16/185* (2019.01); *G06F 16/93* (2019.01)

(58) Field of Classification Search
None
See application file for complete search history.

(56) References Cited

U.S. PATENT DOCUMENTS

| 6,868,143 B1* | 3/2005 | Menon ................ H04M 3/5307 379/67.1 |
| 2006/0271915 A1* | 11/2006 | Stefik ..................... G06F 21/10 717/127 |
| 2007/0005581 A1* | 1/2007 | Arrouye .................... G06F 7/00 |
| 2008/0016233 A1* | 1/2008 | Schneider ......... G06F 17/30887 709/230 |
| 2008/0104032 A1* | 5/2008 | Sarkar ................ G06F 17/3089 |

(Continued)

FOREIGN PATENT DOCUMENTS

JP    2009-069912 A    4/2009

*Primary Examiner* — Wilson Lee
(74) *Attorney, Agent, or Firm* — Canon U.S.A., Inc. I.P. Division

(57) ABSTRACT

A document management system is provided which enables folder hierarchy management with respect to a document management server not having a function of managing a document in a folder hierarchical structure by using a keyword dictionary and an index function included in the document management server. A document management client registers a keyword indicating a virtual folder structure in the keyword dictionary of the document management server. In addition, an identifier of the keyword dictionary corresponding to a hierarchy to be stored is associated with each folder and document, and registered. The document management client performs control to display the folder and the document in the hierarchical structure based on the registered information pieces. A document management client apparatus may register a keyword in the keyword dictionary, and register a folder and a file as content in a content information management unit of the server.

9 Claims, 14 Drawing Sheets

(56) References Cited

U.S. PATENT DOCUMENTS

| | | | |
|---|---|---|---|
| 2008/0141117 A1* | 6/2008 | King | G06F 17/30011 |
| | | | 715/238 |
| 2008/0306954 A1* | 12/2008 | Hornqvist | G06F 21/6218 |
| 2008/0307343 A1* | 12/2008 | Robert | G06F 3/04817 |
| | | | 715/765 |
| 2010/0306080 A1* | 12/2010 | Trandal | G06Q 10/10 |
| | | | 705/26.8 |
| 2011/0231411 A1* | 9/2011 | Shein | G06F 17/3071 |
| | | | 707/749 |
| 2013/0066633 A1* | 3/2013 | Krishnan | G10L 15/26 |
| | | | 704/270.1 |
| 2014/0019498 A1* | 1/2014 | Cidon | G06F 17/3007 |
| | | | 707/827 |
| 2015/0199367 A1* | 7/2015 | Hammer | G06F 16/125 |
| | | | 707/654 |
| 2016/0210306 A1* | 7/2016 | Kumarasamy | G06F 16/178 |
| 2016/0216904 A1* | 7/2016 | Joshi | G06F 3/0619 |
| 2017/0140219 A1* | 5/2017 | King | G06K 9/00483 |

* cited by examiner

FIG.11

TABLE A

| LIBRARY ID (A1) | LIBRARY NAME (A2) |
|---|---|
| LIB-01 | Library1 |
| LIB-02 | Library2 |

FIG.12

TABLE B

| LIBRARY ID (B1) | KEYWORD ID (B2) | KEYWORD (B3) |
|---|---|---|
| LIB-01 | K-0000001 | / |
| LIB-01 | K-0000002 | /Folder01/ |
| LIB-01 | K-0000003 | /Folder02/ |
| LIB-01 | K-0000004 | /Folder01/Folder03/ |
| LIB-01 | K-0000005 | /Folder01/Folder03/Folder04/ |
| LIB-01 | K-0000006 | /Folder01/Folder03/Folder05/ |
| LIB-02 | K-0000007 | / |

FIG.13

TABLE C

| LIBRARY ID (C1) | CONTENT ID (C2) | CONTENT NAME (C3) | FILE (C4) |
|---|---|---|---|
| LIB-01 | C-0001 | Folder01 | Folder.fdr |
| LIB-01 | C-0002 | Folder02 | Folder.fdr |
| LIB-01 | C-0003 | Folder03 | Folder.fdr |
| LIB-01 | C-0004 | Folder04 | Folder.fdr |
| LIB-01 | C-0005 | Folder05 | Folder.fdr |
| LIB-01 | C-0006 | Doc-001.pdf | Doc-001.pdf |
| LIB-01 | C-0007 | Doc-002.doc | Doc-002.doc |

FIG.14

TABLE D

| LIBRARY ID (D1) | CONTENT ID (D2) | INDEX NAME (D3) | INDEX VALUE (D4) |
|---|---|---|---|
| LIB-01 | C-0001 | CONTENT TYPE | F |
| LIB-01 | C-0001 | STORAGE HIERARCHY ID | K-0000001 |
| LIB-01 | C-0001 | FOLDER COLOR | Yellow |
| LIB-01 | C-0002 | CONTENT TYPE | F |
| LIB-01 | C-0002 | STORAGE HIERARCHY ID | K-0000001 |
| LIB-01 | C-0002 | FOLDER COLOR | Blue |
| LIB-01 | C-0003 | CONTENT TYPE | F |
| LIB-01 | C-0003 | STORAGE HIERARCHY ID | K-0000002 |
| LIB-01 | C-0003 | FOLDER COLOR | Yellow |
| LIB-01 | C-0004 | CONTENT TYPE | F |
| LIB-01 | C-0004 | STORAGE HIERARCHY ID | K-0000004 |
| LIB-01 | C-0004 | FOLDER COLOR | Green |
| LIB-01 | C-0005 | CONTENT TYPE | F |
| LIB-01 | C-0005 | STORAGE HIERARCHY ID | K-0000004 |
| LIB-01 | C-0005 | FOLDER COLOR | Red |
| LIB-01 | C-0006 | CONTENT TYPE | D |
| LIB-01 | C-0006 | STORAGE HIERARCHY ID | K-0000004 |
| LIB-01 | C-0007 | CONTENT TYPE | D |
| LIB-01 | C-0007 | STORAGE HIERARCHY ID | K-0000004 |

DOCUMENT MANAGEMENT CLIENT APPARATUS AND DOCUMENT MANAGEMENT METHOD

BACKGROUND OF THE INVENTION

Field of the Invention

The present disclosure relates to a document management client which offers a user a folder hierarchical structure virtually constructed with respect to a document management server which does not have a function of managing a document in the folder hierarchical structure and manages the document by indexing.

Description of the Related Art

Conventionally, document management systems are used in offices. The document management systems store and manage document image files obtained by digitalizing various paper documents produced in relation to business operations and document files created by office applications by computers as documents.

There are two main types of management methods described below in the document management system.

The first method is for constructing a folder hierarchy having meaning in a system and storing a document according to the meaning of the folder hierarchy. The first method can finely control classification of documents to be registered in the folder hierarchy, and data can be intuitively classified by viewing the folder hierarchy, so that the method is adopted in file management methods on many computers as well as the document management systems.

The second method is for accurately indexing and managing a document. In the second method, a document is registered without using a folder hierarchical structure as a storage location and, when a user specifies an index imparted to a desired document and performs an index search, the document is narrowed down and displayed. However, according to the second method, a user needs to perform an initial setup by specifically defining an index to be used and impart the index to each management target document without fail. In addition, in the case of changing a range or a purpose of use of the document management system, maintenance is required to reconsider the index setting.

When general client applications accessible to a plurality of document management servers are considered, changing an operation method according to a type of the document management server is not suitable for user's work efficiency from in terms of unity of operability. For users who are familiar with operations in the folder hierarchical structure, it is desirable that the folder hierarchy management can be performed in document management servers which do not have functions of performing management in the folder hierarchical structure.

In Japanese Patent Application Laid-Open No. 2009-069912, a technique is discussed in which meta information including an index is added to actual data of a management target file, and a database of a keyword system regarding a virtual folder and a virtual file is stored, so that a file is managed using the virtual folder. According to the method discussed in Japanese Patent Application Laid-Open No. 2009-069912, a file can be managed in a virtual folder hierarchy.

However, according to the method discussed in Japanese Patent Application Laid-Open No. 2009-069912, it is necessary to manage similar information pieces (file path information and the like) in two places, namely the actual data and the database, for realizing the file management in the virtual folder. In addition, management information is added to the metadata of the actual file as the management target, originality of the document created by a user cannot be ensured in the document management system. Further, when management data pieces expanding a function provided by the document management system increases, information pieces to be managed are also increased concomitantly therewith. Furthermore, since similar information pieces are managed in a plurality of places, the information pieces in the plurality of places need to be updated when the information is changed, and thus there is an issue that a system load is also increased.

SUMMARY OF THE INVENTION

According to an aspect of the present disclosure, a document management client apparatus communicates with a document management server including a content information management unit configured to manage basic information of a content, an index information management unit configured to manage an index of the content, and a keyword dictionary configured to manage a keyword in association with a keyword identifier, the document management client apparatus including: a first registration unit configured to register information regarding a hierarchical structure of a folder as a keyword in the keyword dictionary in association with a keyword identifier, a second registration unit configured to register a folder as a content in the content information management unit in association with a content identifier and register a keyword identifier associated with a storage hierarchy of the folder in the index information management unit in association with the content identifier of or associated with the folder, and a third registration unit configured to register a file as a content in the content information management unit in association with a content identifier and register a keyword identifier associated with a storage hierarchy of the file in the index information management unit in association with the content identifier of or associated with the file.

According to other aspects of the present disclosure, one or more additional document management client apparatuses, one or more document management methods and one or more mediums are discussed herein. Further features of the present disclosure will become apparent from the following description of exemplary embodiments with reference to the attached drawings.

BRIEF DESCRIPTION OF THE DRAWINGS

FIG. 11 is a table of a configuration example of library information.

FIG. 12 is a table of a configuration example of a keyword dictionary.

FIG. 13 is a table of a configuration example of content information.

FIG. 14 is a table of a configuration example of index information.

DESCRIPTION OF THE EMBODIMENTS

Figure 1:
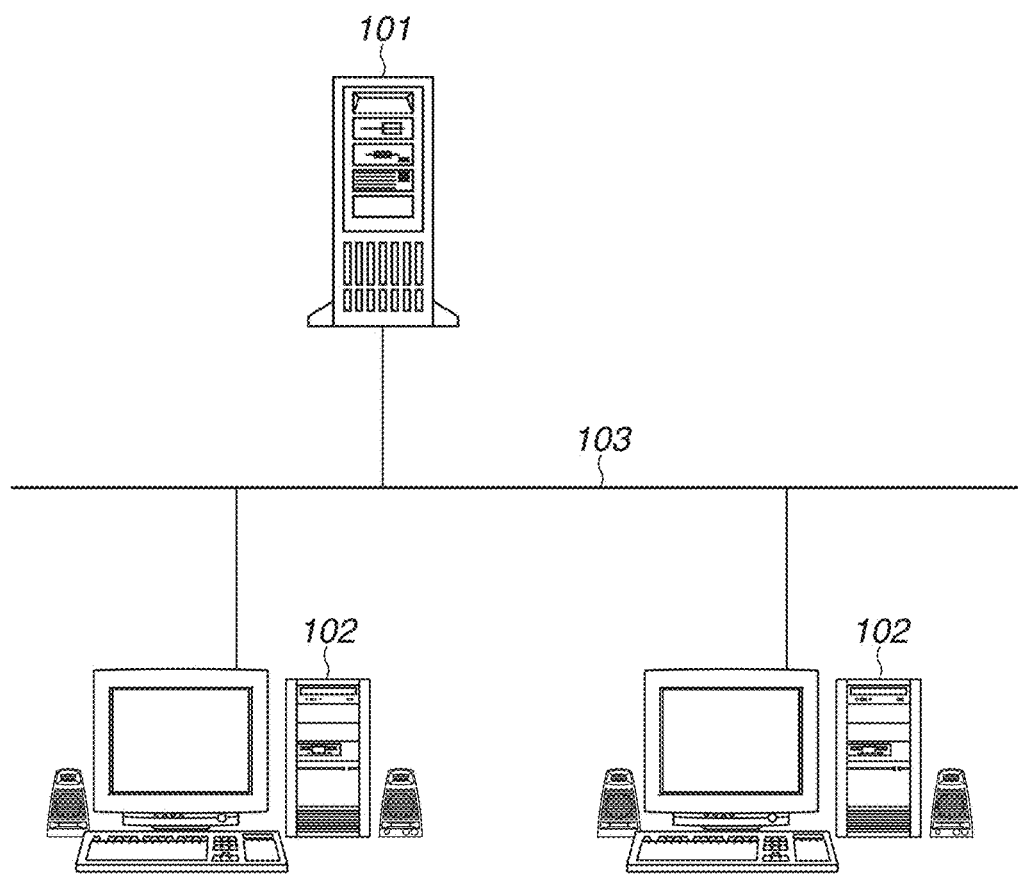
FIG. 1 illustrates a configuration example of a document management system.

FIG. 1 illustrates a configuration example of a document management system according to the present exemplary embodiment.

A document management server 101 manages (stores/provides) a document file in response to a request from a client 102 described below.

The client PC (a document management client apparatus) 102 is a PC executing a document management client application, and when a user operates a document management screen 500 illustrated in FIG. 5 described below, the client PC 102 handles a document in the document management server 101. A plurality of the client PCs 102 is present in and connected to a local area network (LAN) 103 described below and respectively connected to the document management server 101.

The LAN 103 is a local area network for connecting each device. A configuration form of the LAN 103 is not limited as long as the above-described devices are in communicable states.

Figure 2:
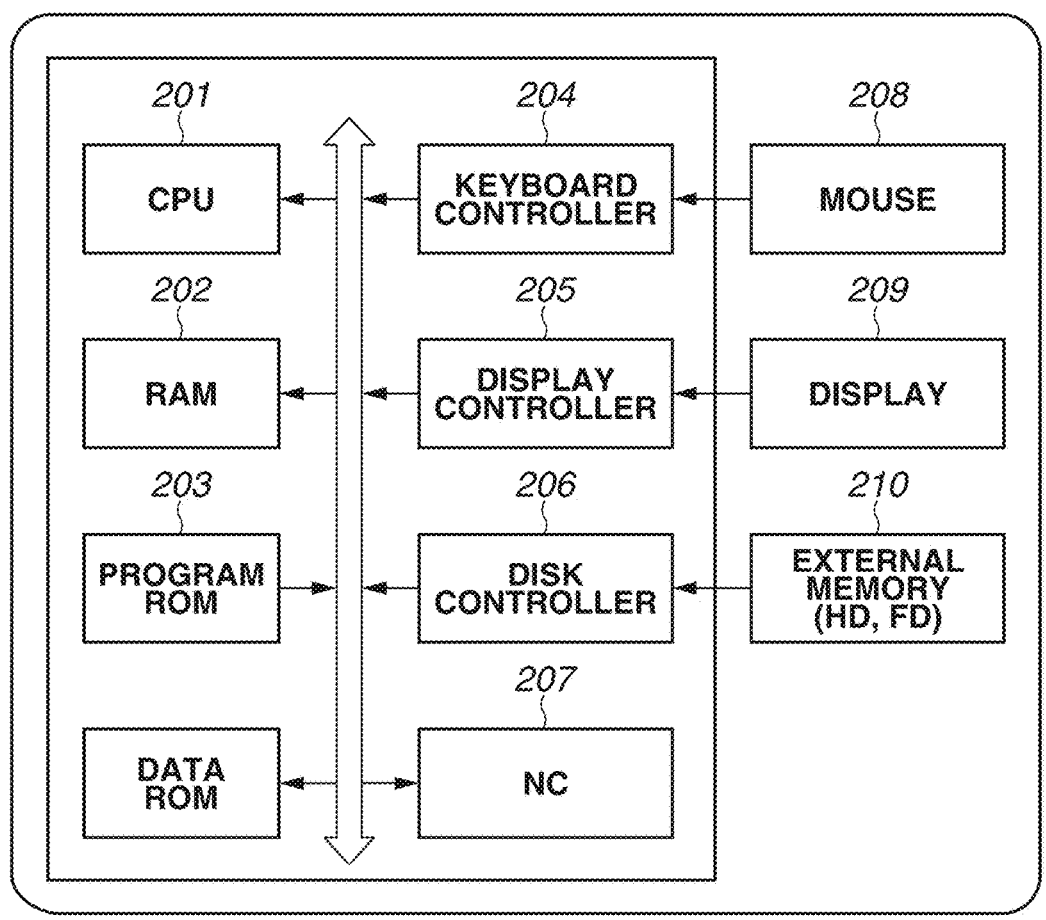
FIG. 2 illustrates a hardware configuration example.

FIG. 2 illustrates a hardware configuration example of the document management server 101 and the client PC (the document management client apparatus) 102 according to the present exemplary embodiment. The hardware configuration example illustrated in FIG. 2 is that of a general information processing apparatus. The document management server 101 and the client PC 102 according to the present exemplary embodiment respectively executes a server program and a client program on the hardware configuration and thus function as a server and a client.

In FIG. 2, a central processing unit (CPU) 201 controls each block by executing a program, such as an operating system (OS) and an application, stored in a program ROM of a read-only memory (ROM) 203 or loaded from an external memory 210, such as a hard disk (HD), to a random access memory (RAM) 201. An OS is an abbreviation of an operating system operating on a computer, and hereinbelow the operating system is referred to as the OS. Processing in each sequence described below can be realized by executing the program.

The RAM 202 functions as a main memory and a work area of the CPU 201, and the like. A keyboard controller 204 controls an input from a mouse 208 as a pointing device and a key board not illustrated. A display controller 205 controls display on a display 209. A disk controller 206 controls data access to the external memory 210, such as a hard disk (HD) which stores various data pieces and programs. A network interface card (NIC) 207 as a network controller executes communication control processing with respect to a device connected via the LAN 103. Unless otherwise specifically noted in the entire following description, the CPU (computer) 201 is an entity on the hardware for executing processing in the document management server 101 and the client PC 102. The computer functions as a processing unit for executing each processing described below by executing an application program installed in the external memory 210.

Figure 3:
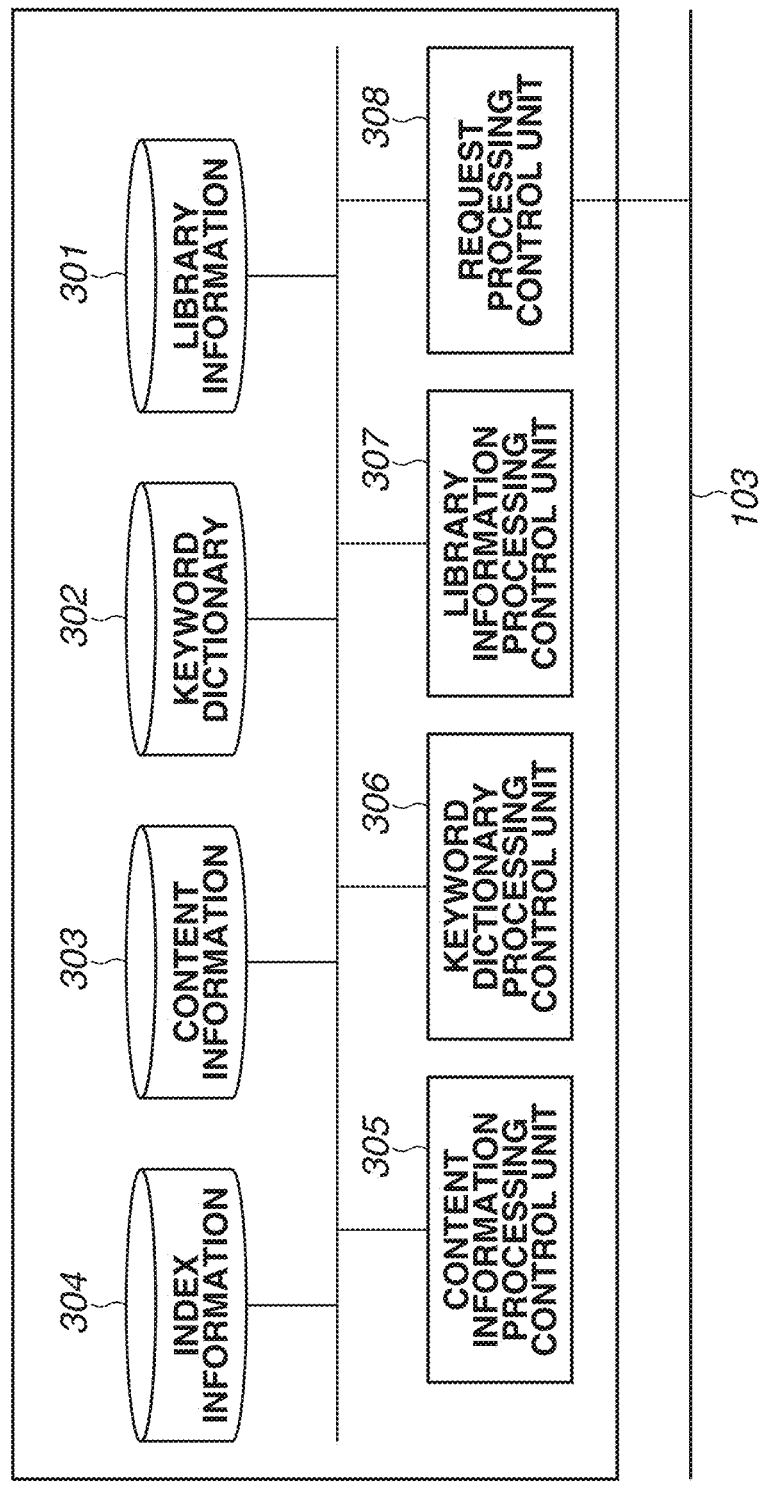
FIG. 3 illustrates a function configuration of a document management server.

FIG. 3 illustrates a function configuration of the document management server 101.

Library information 301 in FIG. 3 is a table (a library information management unit) for defining a unit of a document storage destination in the document management server 101 and managing information indicating the unit. According to the present exemplary embodiment, the unit of the document storage destination is referred to as a "library".

A configuration of the library information 301 and an example of information stored therein are described with reference to a table A in FIG. 11. The table A includes two items, namely a library identification (ID) (A1) and a library name (A2). The library ID (A1) is an identifier for uniquely identifying a library in the document management server 101. The library ID is information used for associating information pieces described below in FIGS. 12 to 14 (tables B to D). The library name (A2) is a name for making the library ID (A1) visually understandable. A character string of the library name is displayed on the document management screen 500 described below.

A keyword dictionary 302 in FIG. 3 is a table (a keyword information management unit) for managing a keyword character string used in each library. The registered keyword indicates a unique value (character string) in the library, and correspondence between each keyword and identifier thereof is referred to as a keyword dictionary in the present specification.

A configuration of the keyword dictionary 302 and an example of information stored therein are described with reference to the table B in FIG. 12. A library ID (B1) is information for identifying a library to which keyword information belongs, and any of the values defined in the library ID (A1) of the table A is stored. A keyword ID (B2) is an identifier for identifying the registered keyword information. The keyword ID has a configuration taking a unique value throughout the system. A keyword (B3) indicates a registered keyword character string. Information regarding a hierarchical structure for displaying a folder and a document in a folder hierarchical structure (a folder tree) is registered as the keyword (B3).

Content information 303 in FIG. 3 is a storage location of a content which is a main function of the document management server 101 and a table (a content information management unit) for managing basic information of the content.

A configuration of the content information 303 and an example of information stored therein are described with reference to the table C in FIG. 13. A library ID (C1) is information for identifying a library indicating a storage destination of a content, and any of the values defined in the library ID (A1) of the table A is stored. A content ID (C2) is an identifier (a content identifier) for uniquely identifying the content information registered in the document management server 101. The content ID (C2) is used as a key to specify the content information and to obtain information in the table D described below. A content name (C3) is a name for making a stored document visually understandable and displayed on the document management screen 500 described below. A file (C4) indicates a stored file entity indicated by the content. According to the present exemplary embodiment, binaries of the files are stored as they are in the tables, however, this configuration is not intend to limit other management methods in which only a path is managed in a table and an entity is managed in a file server and the like separately prepared.

Index information 304 in FIG. 3 is a table (an index information management unit) for storing index information stored in the content itself stored in the content information 303.

A configuration of the index information 304 and an example of information stored therein are described with reference to the table D in FIG. 14. A library ID (D1) and a content ID (D2) works in pairs as an identifier for specifying the content information in the table C. Information pieces matching with these two information pieces are regarded as the index information included in the content. An index name (D3) is a name of an index included in the content. Each content includes a plurality of information pieces of different index names and thus has a structure including the index information. An index value (D4) indicates an index value included in the content. According to the present exemplary embodiment, the index value is stored as a character string, however, a type is not limited to the character string and a binary and a numerical value can be stored as necessary. An index necessary for describing the above-described present exemplary embodiment is described, however, it is not intended to limit a user to add a necessary index.

Examples of data using FIGS. 11 to 14 (the tables A to D) are described below.

With reference to the library information in FIG. 11, there are two libraries named Library1 and Library2 in the document management server 101.

With reference to the keyword dictionary in FIG. 12, a plurality of keywords indicating the folder hierarchy in Library1 is registered. Further, a keyword indicating the folder hierarchy of a root folder is registered in Library2.

With reference to the content information in FIG. 13, five folders from Folder01 to Folder05 and two documents, Doc-0001.pdf and Doc-0002.doc are registered as contents.

With reference to the index information in FIG. 14, each content information is associated with the following index information (the index name and the index information).

Content type: a flag indicating whether the content is a folder or a document (F: folder, D: document)

Storage hierarchy ID: a keyword ID of a keyword indicating a hierarchy in which the relevant content is stored Folder color: color information added only to the content type of the folder (for example, Yellow, Blue, Green, and Red)

Figure 5:
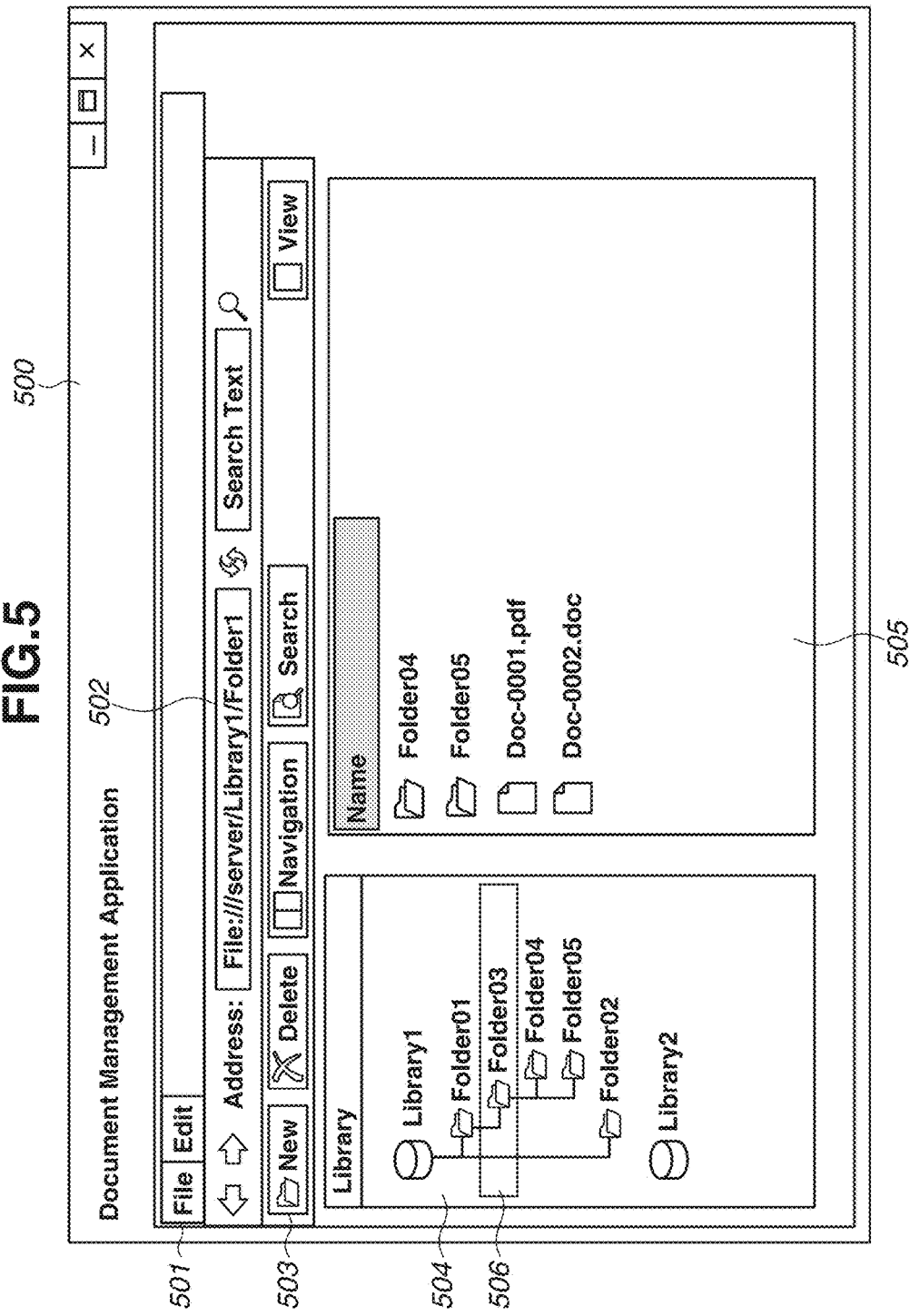
FIG. 5 illustrates a configuration example of a screen displayed by a document management client personal computer (PC).

According to the information pieces in the above-described FIGS. 11 to 14 (the tables A to D), the folder hierarchy and the contents are displayed on the document management screen 500 in FIG. 5. In the tables A to D, items essential for describing the present exemplary embodiment are included, however, it is not intended to limit other items to be included in the tables.

A content information processing control unit 305 in FIG. 3 is a processing control unit for handling data in the content information 303 and the index information 304. The content information processing control unit 305 collectively provides data pieces of the content information 303 specified by a client and the index information 304 regarding the specified content. Further, the content information processing control unit 305 performs processing for storing the content information 303 specified by the client and the index information 304 in the table.

A keyword dictionary processing control unit 306 is a processing control unit for handling data of the keyword dictionary 302. The keyword dictionary processing control unit 306 provides keyword dictionary information and updates data of the keyword dictionary 302 according to an instruction from the client.

A library information processing control unit 307 provides the library information 301 and updates data of the library information 301.

A request processing control unit 308 is a processing control unit for controlling communication of the client PC 102 with the content information processing control unit 305, the keyword dictionary processing control unit 306, and the library information processing control unit 307.

The request processing control unit 308 receives a request transmitted from the client PC 102 to the document management server 101, transfers processing to the content information processing control unit 305, the keyword dictionary processing control unit 306, and the library information processing control unit 307, and transmits a processing result by each control unit to the client.

Figure 4:
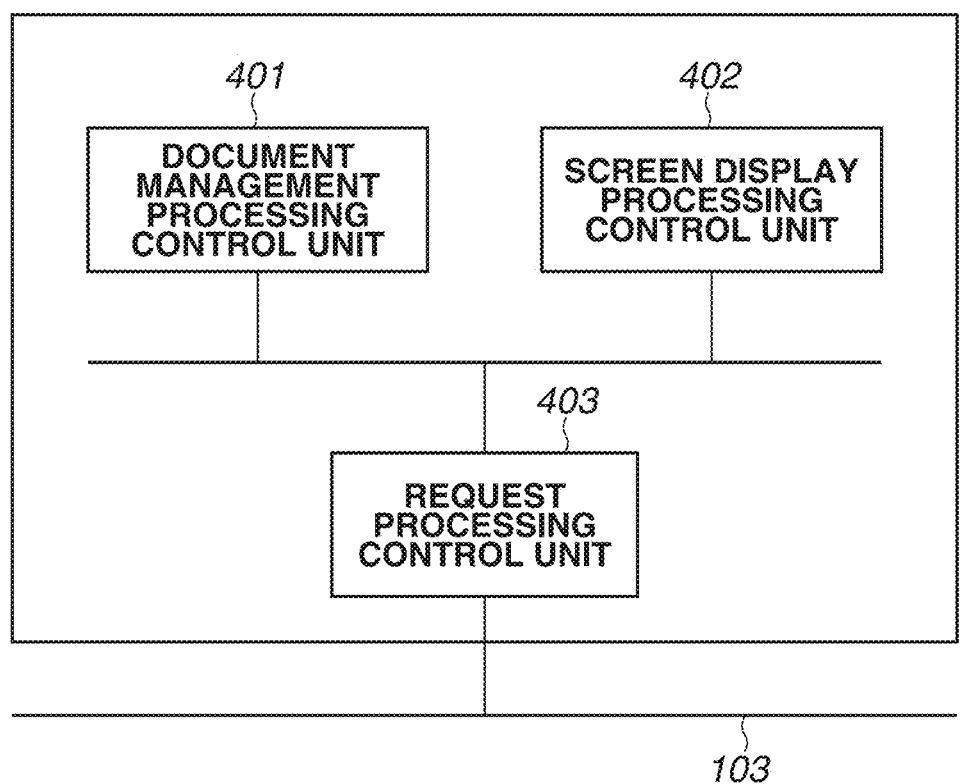
FIG. 4 illustrates a function configuration of a document management client.

FIG. 4 illustrates a function configuration of the client PC (a document management client application) 102 which accesses to the document management server 101.

A document management processing control unit 401 is a processing control unit for performing processing control regarding a document with respect to the data provided from the document management server 101. The document management processing control unit 401 mainly performs obtainment of a content list, generation, update, and deletion of a folder, and generation, update, and deletion of a document. The document management processing control unit 401 is a main area for executing processing illustrated in flowcharts described below.

A screen display processing control unit 402 is a processing control unit for performing processing regarding a user operation using the client PC 102. The screen display processing control unit 402 displays data obtained by the document management processing control unit on the display 209 via the display controller 205. Further, the screen display processing control unit 402 notifies the document management processing control unit 401 of the user operation using the input device, such as the mouse 208, via the keyboard controller 204. A screen displayed by the screen display processing control unit 402 is described below with reference to FIG. 5.

A request processing control unit 403 is a processing control unit for performing control for data communication with the document management server 101 in response to the user operation.

FIG. 5 illustrates the document management screen 500 displayed and controlled by the document management client application operating on the client PC 102. The menu 501 displays a list of execution commands of operations on a folder or a document to enable execution thereof. An address bar 502 displays a path of a folder currently referred to. When a path of a desired folder is input to the address bar 502, a document file included in the folder of the specified path is displayed in a list in a content list view 505 described below.

A tool bar 503 displays a shortcut button corresponding to an operation executable in the menu 501. A navigation pane 504 displays a list of registered libraries and a position of the folder currently referred to. The library represents an uppermost hierarchy of a connection destination, and a folder is present in a lower hierarchy of the library hierarchy in the hierarchical structure.

The display in the navigation pane 504 in FIG. 5 is an embodiment of the hierarchical structure based on the information pieces described in FIGS. 11 to 14 (the tables A to D). The content list view 505 displays a list of a folder and a document included immediately below the library or the folder selected in the navigation pane 504. The content list view 505 displays contents immediately below in a state in which "Folder03" is selected in the navigation pane 504 (a selection state 506).

The data pieces (FIGS. 11 to 14) provided by the document management processing control unit 401 are stored in the screen display processing control unit 402, and the navigation pane 504 and the content list view 505 performs display based on these data pieces. For example, the library name and the library ID can be specified based on the library information in FIG. 11. Information about the hierarchical structure of each library corresponding to a keyword identifier can be specified by the keyword dictionary in FIG. 12. Further, a name and actual data of each folder and document can be specified by the content information in FIG. 13. Furthermore, whether each content stored in each library is a folder or a document can be identified, and an identifier of the keyword dictionary indicating a hierarchy in which each content is stored can be specified based on the index information in FIG. 14. Color of each content can be also specified. The folder and the document can be displayed in the hierarchical structure based on these specified information pieces.

Figure 6:
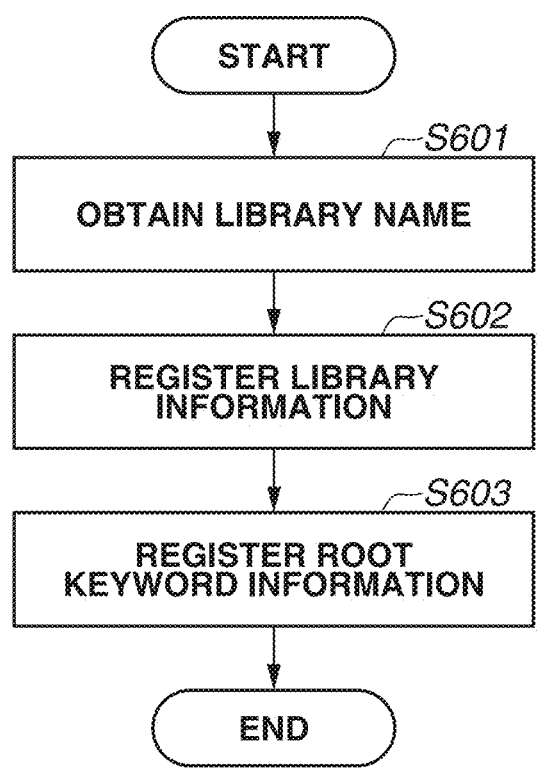
FIG. 6 is a flowchart illustrating category generation processing.

FIG. 6 illustrates a processing flow of when a library is newly generated. A user instructs "generation of new library" from the menu 501 on the document management screen 500 of the client PC 102 and inputs and determines a name of the library to be generated in a library name input dialogue (not illustrated since it is only for inputting a character string) displayed later. Based on the determination, the present processing flow is started, and the document management processing control unit 401 performs processing using the CPU 201 of the client PC 102.

In step S601, the CPU 201 obtains the library name input in the above-described library name input dialogue. When the obtainment is completed, the processing proceeds to step S602.

In step S602, the CPU 201 transmits a library information registration request by the obtained library name to the document management server 101. The request processing control unit 308 of the document management server 101 which receives the request starts processing of the library information processing control unit 307.

The library information processing control unit 307 generates a library ID (A1) not overlapping with the existing library ID (A1) and registers data in the library information 301 together with the received library name. When the data registration is completed, the processing proceeds to step S603.

In step S603, the CPU 201 obtains the library ID (A1) of the registered library information, generates the keyword dictionary information by combining the obtained library ID (A1) and the keyword information "/", and transmits the generated keyword dictionary information to the document management server 101. The request processing control unit 308 of the document management server 101 which receives the keyword dictionary information starts processing of the keyword dictionary processing control unit 306. The keyword dictionary processing control unit 306 generates a keyword ID (B2) not overlapping with the existing keyword ID (B2) and registers the generated keyword ID in the keyword dictionary 302 together with the library ID and the keyword received. The keyword "/" represents the root folder (namely the library itself). When the registration of the library information and the keyword dictionary is completed, the present processing flow is terminated.

Figure 7:
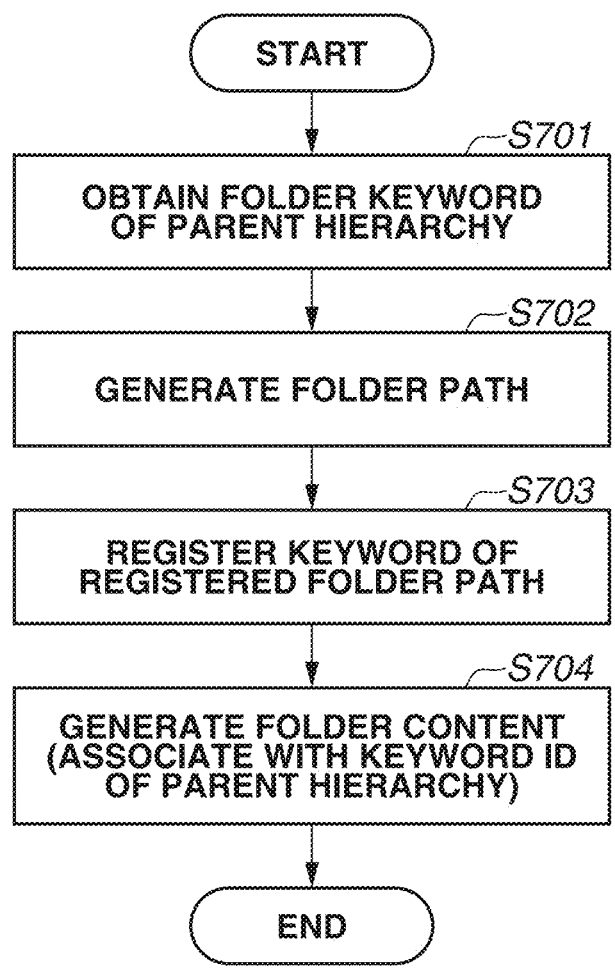
FIG. 7 is a flowchart illustrating folder registration processing.

FIG. 7 illustrates a processing flow of when a folder is generated in an arbitrary place in the library. When a user instructs "generation of new library" from the menu 501 on the document management screen 500 of the client PC 102, the present processing flow is started, and the document management processing control unit 401 performs processing using the CPU 201 of the client PC 102.

In step S701, the CPU 201 performs the following processing. First, the CPU 201 obtains the content information and the index information indicating the folder selected in the navigation pane 504 from the screen display processing control unit 402. Next, the CPU 201 obtains the index value (D4) of the index name "storage hierarchy ID" obtained from the screen display processing control unit 402 and obtains the keyword (B3) of the keyword dictionary 302. Then, the CPU 201 adds the content name (C3) of the content information obtained from the screen display processing control unit 402 and "/" to the end of the keyword (B3) obtained from the document management server 101 to generate path information of an upper folder of the folder to be generated. When "Folder03" is selected in the selection state 506 in FIG. 5, the path information to be generated is "/Folder01/Folder03/". A data example in the present processing flow is described on the assumption that the one is in the state in which "Folder03" is selected in the following description. When the generation of the path information is completed, the processing proceeds to next step S702.

In step S702, the CPU 201 adds a predetermined file name "New_Folder" and "/" to the end of the path information generated in step S701 and generates path information "/Folder01/Folder03/New_Folder" of the folder to be newly generated. According to the present exemplary embodiment, the processing is realized by the processing flow in which a newly generated folder is once generated in a fixed name, and then a user changes the name, however, it may be configured to allow a user to specify an arbitrary name when generating a folder is newly generated. When the generation of the path information is completed, the processing proceeds to next step S703.

In step S703, the CPU 201 transmits a keyword dictionary registration request by the following data pieces to the document management server 101.
Library ID (B1): the library ID being accessed
Keyword ID (B2): (null)
Keyword (B3): the path information generated in step S702

The request processing control unit 308 of the document management server 101 which receives the request starts processing of the keyword dictionary processing control unit 306. The keyword dictionary processing control unit 306 generates a keyword ID (B2) not overlapping with the existing keyword ID (B2) and registers the generated keyword ID in the keyword dictionary 302 together with the library ID and the keyword received. When the registration of the keyword is completed, the processing proceeds to next step S704.

In step S704, the CPU 201 registers the following information pieces. The registration is performed with respect to the request processing control unit 308 of the document management server 101 similar to that described above, and the request processing control unit 308 starts processing of the appropriate processing control unit to register the information.

First, the following information pieces are registered in the content information 303.

Library ID (C1): the library ID being accessed
Content ID (C2): (null)
Content name (C3): "New Folder"
File (C4): Folder.fdr (zero byte file)

The content information processing control unit 305 of the document management server 101 generates a content ID (C2) not overlapping with the existing content ID (C2) and registers the generated content ID in the content information 303 together with other information pieces.

Next, the CPU 201 obtains the keyword ID (B2) including the path information generated in step S701 in the keyword (B3) and registers the following three index data pieces in the index information 304.

Index data 1:
Library ID (D1): the library ID being accessed
Content ID (D2): a new content ID issued when registered in the content information
Index name (D3): the content type
Index value (D4): F Index data 2:
Library ID (D1): the library ID being accessed
Content ID (D2): a new content ID issued when registered in the content information
Index name (D3): the storage hierarchy ID
Index value (D4): the keyword ID (B2) associated with the keyword (B3) corresponding to the path information generated in step S701

Index data 3:
Library ID (D1): the library ID being accessed
Content ID (D2): a new content ID issued when registered in the content information
Index name (D3): the folder color
Index value (D4): Yellow Accordingly, the folder information of "Yellow" is registered immediately below "Folder03" with the name "New Folder". When the registration is completed, the present processing flow is terminated.

Figure 8:
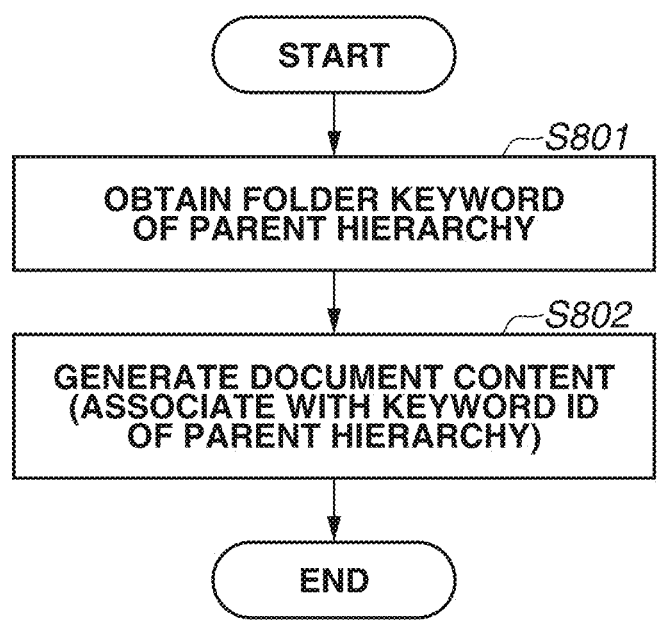
FIG. 8 is a flowchart illustrating document registration processing.

FIG. 8 illustrates a processing flow of when a document is registered in an arbitrary place in the library. When a user instructs "registration of document" from the menu 501 on the document management screen 500 of the client PC 102, a file selection dialogue (not illustrated since it is a general dialogue) is displayed, and the present processing flow is started in response to selection of a file to be registered by the user. The processing in the present processing flow is performed by the document management processing control unit 401 using the CPU 201 of the client PC 102.

In step S801, the CPU 201 performs the following processing. First, the CPU 201 obtains the content information indicated by the folder selected in the navigation pane 504 from the screen display processing control unit 402. Next, the CPU 201 obtains the index value (D4) of the index name "storage hierarchy ID" obtained from the screen display processing control unit 402 and obtains the keyword (B3) of the keyword dictionary 302. Then, the CPU 201 adds the content name (C3) of the content information obtained from the screen display processing control unit 402 and "/" to the end of the keyword (B3) obtained from the server to generate the path information of the upper folder of the folder to be generated.

For example, when a document is registered in "Folder03" in the selection state 506 in FIG. 5, the path information to be generated is "/Folder01/Folder03/". A data example in the present processing flow is described on the assumption that a document is registered in "Folder03" in the following description. When the generation of the path information is completed, the processing proceeds to next step S802.

In step S802, the CPU 201 registers the following information pieces. The registration is performed with respect to the request processing control unit 308 of the document management server 101 similar to that described above, and the request processing control unit 308 starts processing of the appropriate processing control unit to register the information.

First, the following information pieces are registered in the content information 303.
Library ID (D1): the library ID being accessed
Content ID (C2): (null)
Content name (C3): the file name selected by the user in the file selection dialogue
File (C4): a file entity selected by the user in the file selection dialogue The content information processing control unit 305 of the document management server 101 generates a content ID (C2) not overlapping with the existing content ID (C2) and registers the generated content ID in the content information 303 together with other information pieces.

Next, the CPU 201 obtains the keyword ID (B2) including the path information generated in step S701 in the keyword (B3) and registers the following two index data pieces in the index information 304.

Index data 1:
Library ID (D1): the library ID being accessed
Content ID (D2): a new content ID issued when registered in the content information
Index name (D3): the content type
Index value (D4): D Index data 2:
Library ID (D1): the library ID being accessed
Content ID (D2): a new content ID issued when registered in the content information
Index name (D3): the storage hierarchy ID
Index value (D4): the keyword ID (B2) including the path information generated in step S801 in the keyword (B3)

Accordingly, the file selected by the user is registered as a document immediately below "Folder03". When the registration is completed, the present processing flow is terminated.

Figure 9:
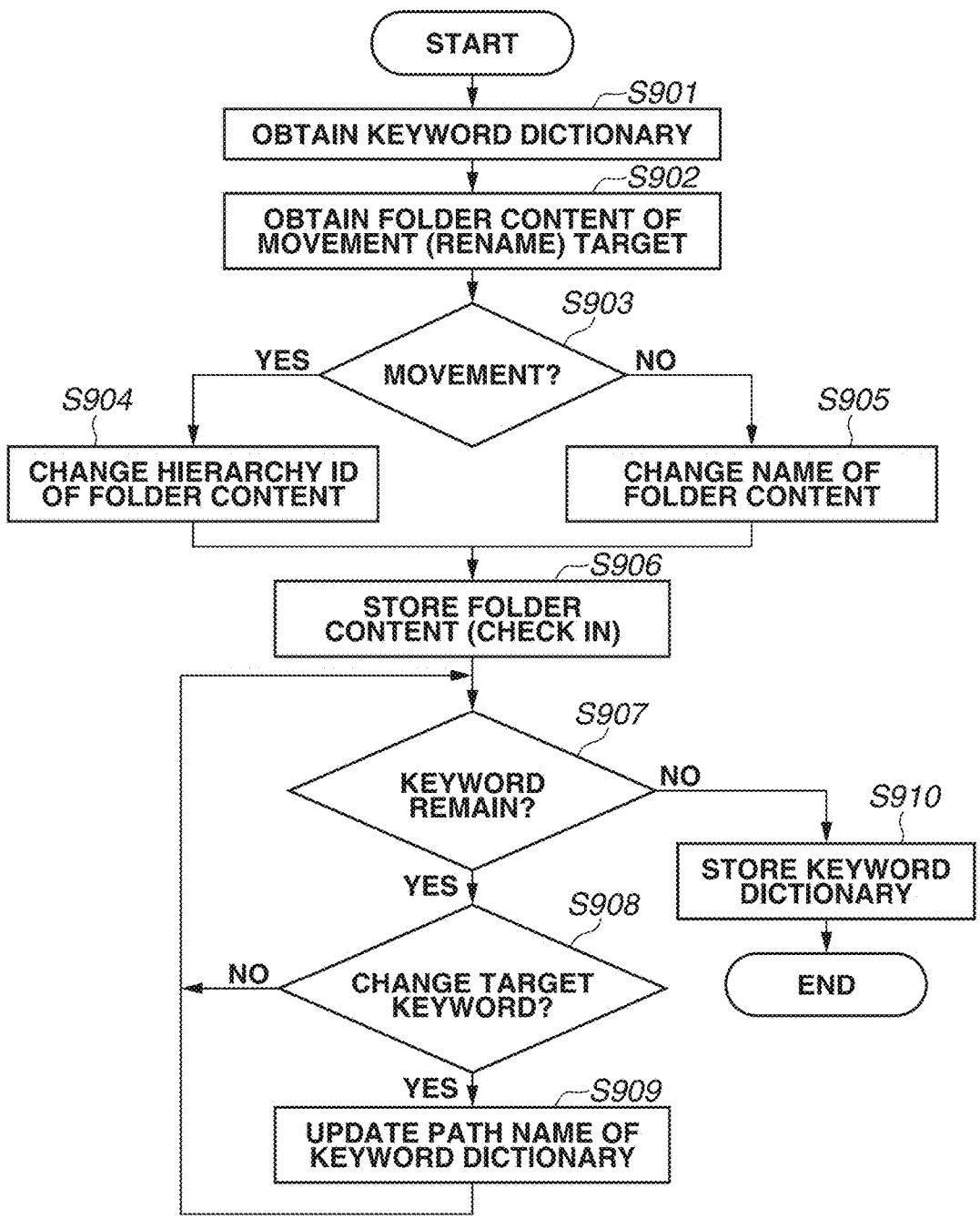
FIG. 9 is a flowchart illustrating folder movement/folder name change processing.

FIG. 9 illustrates a processing flow of folder movement or folder name change. Regarding the folder movement, the present processing flow is started when drag and drop is performed on a folder icon of an arbitrary folder displayed in the navigation pane 504 or the content list view 505 on the document management screen 500 of the client PC 102. Regarding the folder name change, the present processing flow is started when a folder subjected to the name change is selected on the document management screen 500, "change of folder name" is instructed from the menu 501, and a name is input in a displayed folder name input dialogue (not illustrated). The processing in the present processing flow is performed by the document management processing control unit 401 using the CPU 201 of the client PC 102.

In step S901, the CPU 201 obtains all keywords associated with the library being accessed from the keyword dictionary 302. The processing in the step is performed with respect to the request processing control unit 308 of the document management server 101, and the keyword dictionary processing control unit 306 started by the request processing control unit 308 obtains data from the keyword dictionary 302 and transmits the data to the client PC 102.

A list of the obtained keywords is stored in the RAM 202 during the present processing flow and used in steps described below. When the obtainment of the keyword is completed, the processing proceeds to next step S902.

In step S902, the CPU 201 obtains the content information and the index information of the processing target folder (movement or name change) instructed by the user from the document management screen 500. Next, the CPU 201 obtains, from the list of keywords obtained in step S901, the keyword (B3) of the keyword ID (B2) which matches with the index value (D4) of the index name "storage hierarchy ID" corresponding to the processing target folder. Then, the CPU 201 adds the content name (C3) stored in the content information of the processing target folder and "/" to the end of the obtained keyword (B3) to generate path information of the processing target folder. The generated path information of the processing target folder and the obtained processing target content information and index information are stored in the RAM 202 during the present processing flow and used in steps described below. When the storage to the RAM 202 is completed, the processing proceeds to next step S903.

In step S903, the CPU 201 determines whether the processing performed by the user is movement or name change. In the case of the movement (YES in step S903), the processing proceeds to step S904, whereas in the case of the name change (NO in step S903), the processing proceeds to step S905.

In step S904, the CPU 201 changes a value of "the storage hierarchy ID" stored in the index information obtained in step S902. First, the CPU 201 obtains the content information and the index information regarding a movement destination folder instructed by the user on the document management screen 500. Next, the CPU 201 obtains, from the list of keywords obtained in step S901, the keyword (B3) of the keyword ID (B2) which matches with the index value (D4) of the index name "storage hierarchy ID" corresponding to the movement destination folder. Then, the CPU 201 adds the content name (C3) stored in the content information of the movement destination folder and "/" to the end of the keyword (B3) to generate path information of the movement destination folder. The CPU 201 obtains the keyword ID (B2) including the path information in the keyword (B3) from the list of keywords obtained in step S901 and updates the index value (D4) of the index information "storage hierarchy ID" stored in the RAM 202 with the obtained keyword ID (B2). Further, the CPU 201 stores the generated path information of the movement destination folder in the RAM 202. When the update of the index value and the storage of the path information of the movement destination folder are completed on the RAM 202, the processing proceeds to step S906.

In step S905, the CPU 201 changes the value of the content name (C3) of the content information obtained in step S902. First, the CPU 201 obtains the folder name input to the above-described folder name input dialogue. Next, the CPU 201 obtains, from the list of keywords obtained in step S901, the keyword (B3) of the keyword ID (B2) which matches with the index value (D4) of the index name "storage hierarchy ID" corresponding to the processing target folder. Then, the CPU 201 updates the content name (C3) of the content information stored in the RAM 202 in step S902 with the folder name obtained from the folder name input dialogue. Further, the CPU 201 adds the folder name obtained from the folder name input dialogue and "/" to the end of the keyword (B3) to generate path information of the renamed folder and stores the generated path information in the RAM 202. When the update of the content name (C3) and the storage of the path information of the renamed folder are completed on the RAM 202, the processing proceeds to step S906.

In step S906, the CPU 201 updates the content information 303 and the index information 304 in the document management server 101 with the content information and the index information on the RAM 202 which are updated in step S904 or step S905. The registration is performed with respect to the request processing control unit 308 of the document management server 101, and the request processing control unit 308 updates the information by starting processing of the processing control unit appropriate for the storage. When the update processing is completed, the processing proceeds to next step S907.

In steps S907 to S909, the CPU 201 performs update processing on the list of keywords obtained in step S901.

In step S907, the CPU 201 obtains one keyword from the list of keywords as an update processing target. If obtainment is completed on all keywords in the list of keywords (NO in step S907), the processing proceeds to step S910. If one unprocessed keyword can be obtained (YES in step S907), the processing proceeds to next step S908.

In step S908, the CPU 201 performs prefix match comparison on the keyword obtained in step S907 and the path information of the processing target folder stored in the RAM 202 in step S902. When the keyword matches with the path information, the keyword is determined as a lower folder of the processing target folder (YES in step S908), the processing proceeds to next step S909. When the keyword does not match with the path information, the keyword is determined as indicating a folder in a hierarchy different from the processing target folder (NO in step S908), the processing returns to step S907, and the CPU 201 shifts the processing to a next keyword.

In step S909, the CPU 201 replaces a character string portion matched in step S908 with the path information stored in the RAM 202 in step S904 or step S905 and updates the keyword on the RAM 202. For the path information on the RAM 202, the path information of the movement destination folder is used in step S904, and the path information of the renamed folder is used in step S905. When the update of the keyword on the RAM 202 is completed, the processing returns to step S907, and the CPU 201 shifts the processing to a next keyword.

In step S910, the CPU 201 updates the keyword dictionary 302 with information of the list of keywords updated on the RAM 202. The registration is performed with respect to the request processing control unit 308 of the document management server 101, and the request processing control unit 308 starts the keyword dictionary processing control unit 306 to update the information of the list of keywords transmitted from the client PC 102. When the update of the information of the keyword dictionary is completed, the present processing flow is terminated.

Figure 10:
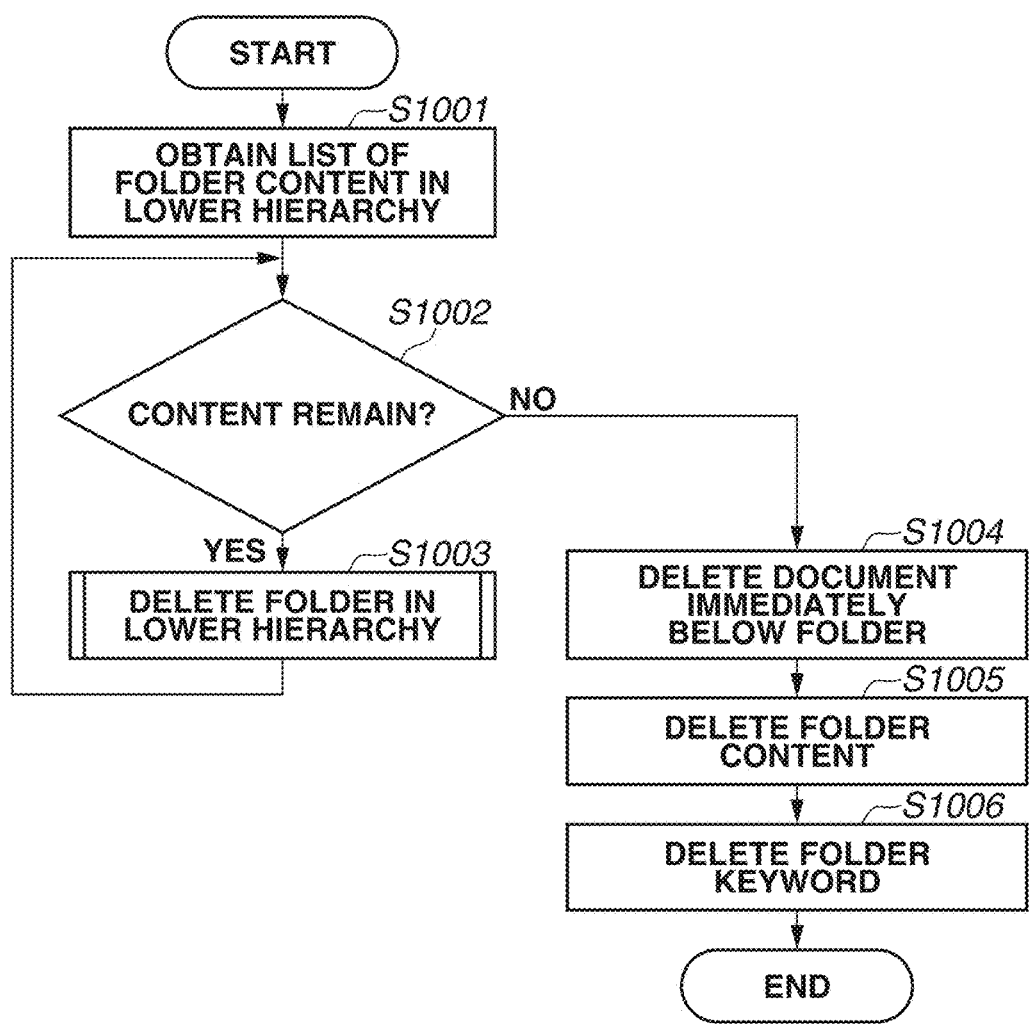
FIG. 10 is a flowchart illustrating folder deletion processing.

FIG. 10 illustrates a processing flow of folder deletion. When a user selects a folder to be deleted on the document management screen 500 of the client PC 102 and instructs "deletion of folder" from the menu 501, the present processing flow is started. However, the processing in step S1003 described below may be recursively executed by the present processing flow. In such a case, the processing is executed not from the menu 501 but by an instruction to start from the present processing flow itself.

In step S1001, the CPU 201 obtains information of a deletion target folder specified in the startup and obtains the folder information of a hierarchy immediately below. First, the CPU 201 obtains the content information and the index information of the specified folder and stores them in the RAM 202. These information pieces to be obtained from the document management server 101 are the information displayed on the document management screen 500 when the deletion processing is started by a user, or the information pieces matching with the specified content ID when the deletion processing is started from the present processing flow. The obtained content information and index information are stored in the RAM 202 during the present processing flow and used in the processing flow described below.

Next, the CPU 201 obtains the keyword (B3) of which the keyword ID (B2) matches with the index value (D4) of the index name "storage hierarchy ID" and generates the path information by adding the content name (C3) of the already obtained content information and "/" to the end of the keyword. The keyword (B3) can be obtained by transmitting the relevant keyword ID (B2) to the keyword dictionary processing control unit 306 of the document management server 101.

Further, the CPU 201 obtains the keyword ID (B2) which stores the generated path information in the keyword (B3) from the keyword dictionary processing control unit 306 of the document management server 101. The generated path information and the keyword ID (B2) indicating the path are stored in the RAM 202 during the present processing flow and used in the processing flow described below.

Then, the CPU 201 obtains a list of the content information which stores the content ID (D2) matching all of the following conditions in the content ID (C2) from the content information processing control unit 305 of the document management server 101.

Condition 1: The obtained keyword ID (B2) is stored in the index value of "the storage hierarchy ID" of the index information 304.

Condition 2: "F" is stored in "the content type" of the index information 304.

The obtained list of the content information of the lower hierarchy is stored in the RAM 202 during the present processing flow and used in steps described below. When the obtainment of the information is completed, the processing proceeds to next step S1002.

In step S1002, the CPU 201 obtains a piece of the content information from the list of the content information stored in the RAM 202. If obtainment is completed on all pieces in the list of the content information (NO in step S1002), the processing proceeds to step S1004. If one unprocessed content information can be obtained (YES in step S1002), the processing proceeds to next step S1003.

In step S1003, the CPU 201 starts the folder deletion processing flow in FIG. 10 using the content information obtained in step S1002 as a parameter. The content information obtained in step S1002 is the folder existing in the lower hierarchy of the processing target folder, and the folder is required to be deleted in advance, so that the deletion processing is performed prior to the deletion of the processing target folder. When processing in the reclusively called present processing flow is completed, the processing returns to step S1002, and the CPU 201 shifts the processing to next content information.

In step S1004, the CPU 201 deletes a document in a hierarchy immediately below the processing target folder. First, the CPU 201 obtains the list of the content information pieces which stores the content ID (D2) matching all of the following conditions in the content ID (C2) from the content information processing control unit 305 of the document management server 101.

Condition 1: The keyword ID (B2) stored in the RAM 202 in step S1001 is stored in "the storage hierarchy ID" of the index information 304.

Condition 2: "D" is stored in "the content type" of the index information 304.

The CPU 201 deletes all of the content information including the content ID (C2) of the obtained content information in data and the index information from the content information 303 and the index information 304. The processing is performed with respect to the request processing control unit 308 of the document management server 101, and the request processing control unit 308 starts processing of the content information processing control unit 305 to delete the information. When the deletion of the obtained content information is completed, the processing proceeds to next step S1005.

In step S1005, the CPU 201 deletes a content as a processing target of the present processing flow. Accordingly, the content information which includes the content ID (C2) stored in the content information stored in the RAM 202 in step S1001 in data and the index information are all deleted from the content information 303 and the index information 304. This processing is similar to the deletion processing performed in step S1004 but conditions are different. When the deletion of the processing target content is completed, the processing proceeds to next step S1006.

In step S1006, the CPU 201 deletes the keyword matching with the keyword ID (B2) indicating the path stored in the RAM 202 in step S1001 from the keyword dictionary 302. The processing is performed with respect to the request processing control unit 308 of the document management server 101, and the request processing control unit 308 starts processing of the keyword dictionary processing control unit 306 to delete the information matching with the relevant keyword ID (B2). When the deletion of the keyword dictionary is completed, the present processing flow is terminated.

According to the present exemplary embodiment, the document management system using a virtual folder hierarchical structure which does not increase a processing load in the system itself can be provided by utilizing the keyword dictionary and the index function included in the document management server. In addition, since actual data of a document file is not changed, originality of a document can be ensured.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-046437, filed Mar. 9, 2015, which is hereby incorporated by reference herein in its entirety.

What is claimed is:

1. A document management client apparatus capable of communicating with a document management server capable of managing content that is a file or a folder by an index and searching for the content using the index, comprising:
   at least a processor; and
   at least a memory coupled to the at least the processor and having stored thereon instructions;
   wherein the index includes a keyword that represents a hierarchical structure of the folder and a content identifier of the content, and
   wherein, when instructions stored in the memory are executed by the processor, the processor and the memory cooperate to act as:
   an acquisition unit configured to, by transmitting a request to the document management server, acquire the keyword identified by a keyword identifier from the document management server that manages the keyword in association with the keyword identifier and manages the content identifier in association with the keyword identifier, and
   a display unit configured to display the hierarchical structure of the content managed by the document management server on a basis of the keyword acquired by the acquisition unit,
   wherein, in a case where a first folder displayed by the display unit is selected by a user operation to delete the first folder, the acquisition unit acquires a content information of the first folder and the keyword, and
   wherein, on a basis of the information acquired by the acquisition unit, a second folder and a file that are associated with a lower layer which is hierarchically below the first folder are deleted.

2. The document management client apparatus according to claim 1 further comprising a first change unit configured to, in a case where a name change of a folder is instructed, change a name of the folder and update information regarding a hierarchical structure of the folder among the keyword that is information pieces regarding a hierarchical structure of a folder.

3. The document management client apparatus according to claim 1 further comprising a second change unit configured to, in a case where movement of a folder is instructed, change a keyword identifier associated with a storage hierarchy of the folder to a keyword identifier associated with a storage hierarchy of a movement destination and update information regarding a hierarchical structure of the folder among the keyword.

4. The document management client apparatus according to claim 1,
   wherein, in a case where the first folder displayed by the display unit is selected by the user operation and it is instructed to perform the processing for deleting the first folder, the file that is associated with a lower layer which is hierarchically below the first folder is deleted after deleting the second folder, and
   wherein the content information of the first folder, the index, and the keyword are deleted after deleting the file.

5. The document management client apparatus according to claim 1,
   wherein the index includes a storage hierarchy ID that indicates a hierarchical layer in which the content is stored and a flag that indicates whether the content is a file or a folder, and
   wherein, in a case where the first folder displayed by the display unit is selected by the user operation and it is instructed to perform the processing for deleting the first folder, a second folder and a file that are associated with a lower layer which is hierarchically below the first folder are identified using the storage hierarchy ID and the flag, and the identified second folder and the identified file are deleted.

6. A document management system, comprising:
   a document management server capable of managing content that is a file or a folder by an index and searching for the content using the index; and
   a document management client apparatus capable of communicating with the document management server;
   wherein the index includes a keyword that represents a hierarchical structure of the folder and a content identifier of the content, and
   wherein the document management server includes
   at least a processor and at least a memory coupled to the at least the processor and having stored thereon instructions, when executed by the at least the processor, and cooperating to act as:
   a management unit configured to manage the keyword in association with a keyword identifier and manage the content identifier in association with the keyword identifier, and
   an identifying unit configured to identify the keyword using the keyword identifier,
   wherein the document management client apparatus includes
   at least a processor and at least a memory coupled to the at least the processor and having stored thereon instructions, when executed by the at least the processor, and cooperating to act as:
   an acquisition unit configured to, by transmitting a request to the document management server, acquire the keyword identified by the identifying unit, and
   a display unit configured to display the hierarchical structure of the content managed by the document management server on a basis of the keyword acquired by the acquisition unit,
   wherein, in a case where a first folder displayed by the display unit is selected by a user operation to delete the first folder, the acquisition unit acquires a content information of the first folder and the keyword, and
   wherein, on a basis of the information acquired by the acquisition unit, a second folder and a file that are associated with a lower layer which is hierarchically below the first folder are deleted.

7. A non-transitory computer-readable medium storing a program for causing a computer to perform a method for controlling a document management client apparatus capable of communicating with a document management server capable of managing content that is a file or a folder by an index and searching for the content using the index, wherein the index includes a keyword that represents a hierarchical structure of the folder and a content identifier of the content, the method comprising:

acquiring, by transmitting a request to the document management server, the keyword identified by a keyword identifier from the document management server that manages the keyword in association with the keyword identifier and manages the content identifier in association with the keyword identifier; and displaying the hierarchical structure of the content managed by the document management server on a basis of the acquired keyword, wherein, in a case where a first folder displayed by the displaying step is selected by a user operation to delete the first folder, a content information of the first folder and the keyword is acquired, and wherein, on a basis of the acquired information, a second folder and a file that are associated with a lower layer which is hierarchically below the first folder are deleted.

8. The non-transitory computer-readable medium according to claim 7, wherein the method further comprises, in a case where a name change of a folder is instructed, changing a name of the folder and updating information regarding a hierarchical structure of the folder among the keyword that is information pieces regarding a hierarchical structure of a folder.

9. The non-transitory computer-readable medium according to claim 7, wherein the method further comprises, in a case where movement of a folder is instructed, changing a keyword identifier associated with a storage hierarchy of the folder to a keyword identifier associated with a storage hierarchy of a movement destination and updating information regarding a hierarchical structure of the folder among the keyword.

* * * * *